United States Patent [19]
Wells

[11] Patent Number: 5,344,241
[45] Date of Patent: Sep. 6, 1994

[54] BEARING ASSEMBLY WITH INTERNAL SEAL
[75] Inventor: David E. Wells, Shawnee, Okla.
[73] Assignee: L&S Bearing Co., Oklahoma City, Okla.
[21] Appl. No.: 152,607
[22] Filed: Nov. 15, 1993
[51] Int. Cl.⁵ .............................................. F16C 33/76
[52] U.S. Cl. ..................................... 384/607; 384/620
[58] Field of Search ............... 384/484, 485, 606, 607, 384/609–617, 618–623, 571

[56] References Cited

U.S. PATENT DOCUMENTS

| | | | |
|---|---|---|---|
| 3,268,279 | 8/1966 | Greby | 384/607 |
| 3,365,040 | 1/1968 | Pitner | 384/618 X |
| 3,519,317 | 7/1970 | Spence et al. | 384/614 |
| 3,639,016 | 2/1972 | Bourgeois . | |
| 4,106,781 | 8/1978 | Benjamin et al. | 277/82 |
| 4,313,644 | 2/1982 | Dagiel | 384/607 |
| 4,325,591 | 4/1982 | Otto . | |
| 4,448,461 | 5/1984 | Otto . | |
| 4,497,495 | 2/1985 | Christiansen | 277/50 |
| 4,592,666 | 6/1986 | Jörnhagen | 384/477 |
| 4,808,012 | 2/1989 | Otto | 384/482 |
| 4,913,450 | 4/1990 | Asberg | 277/68 |
| 4,958,947 | 9/1990 | Peter et al. | 384/609 |
| 5,005,992 | 4/1991 | Dreschmann et al. | 384/484 |

OTHER PUBLICATIONS

"Easy Steer" product brochure, Rockwell International, 1992, (6 Pages plus enlargement of p. 4).

Primary Examiner—Thomas R. Hannon
Attorney, Agent, or Firm—Dunlap, Codding & Lee

[57] ABSTRACT

A tapered roller thrust bearing assembly with an internal seal. The seal is affixed to the inner surface of the closure cup and is totally enclosed thereby. A flexible flange portion on the seal prevents entry of debris into the bearing assembly, yet permits grease to exit the assembly. Because it is totally contained within the closure cup, the seal is protected from injury and wear. Moreover, production of the bearing assembly is simplified.

4 Claims, 1 Drawing Sheet

BEARING ASSEMBLY WITH INTERNAL SEAL

FIELD OF THE INVENTION

The present invention relates generally to bearing assemblies and, more particularly, to tapered roller thrust bearings with internal seals.

SUMMARY OF THE INVENTION

The present invention is directed to a bearing assembly. The assembly comprises a first annular race having an upper surface, a lower surface which partially defines a roller receiving recess, an inner surface which partially defines a central bore, and a peripheral surface. The assembly further includes a second annular race having a peripheral surface, an upper surface spaced a distance from the lower surface of the first annular race to form an annular chamber therebetween and which partially defines a roller receiving recess, a lower surface, and an inner surface which partially defines a central bore.

A plurality of rollers are positioned between the first and second annular races in the roller receiving recesses, and a closure cup is included for containing the first and second races and the rollers in operative position. The closure cup has a top wall which encloses the upper surface of the first race of the first annular race and a side wall extending down from the top wall to enclose the peripheral surfaces of the first and second annular races. The side wall of the closure cup has a first portion which encloses the peripheral surface of the first race, a lip portion which encloses the peripheral surface of the second race and is spaced a distance therefrom to form an annular space thereabout which is continuous with the annular chamber, and a central portion between the first portion and the lip portion which encloses the annular chamber.

An annular seal is secured to the inner surface of the central portion of the side wall of the closure cup. The seal has a flexible flange with a tip that contacts the upper surface of the second annular race so as to divide the annular space from the annular chamber. In this way, entry of debris through the annular space into the bearing assembly is prevented and escape of grease from inside the bearing assembly through the annular space is permitted.

DETAILED DESCRIPTION OF THE PREFERRED EMBODIMENTS

For proper lubrication of a bearing assembly, it is desirable to construct the assembly so that grease can flow through the assembly. Yet, to extend the useful life of the assembly, it is necessary to reduce the extent to which foreign matter such as debris and water can invade the interior of the assembly and rust or otherwise interfere with the function of the roller elements. The bearing assembly of the present invention meets these objectives while at the same time reducing the cost of manufacture, simplifying the assembly process and providing improved consistency in the shape sustaining capacity of the components.

In accordance with the present invention there is provided a tapered roller thrust bearing with an internal seal. The seal is affixed to the inner surface of the closure cup and is totally enclosed thereby. An angled, flexible flange portion on the seal prevents entry of debris and water into the bearing assembly, yet permits grease to exit the assembly. Because it is totally contained within the closure cup, the seal is protected from injury and wear. Moreover, production of the bearing assembly is simplified. These and other advantages of the present invention will be apparent from the following description of a preferred embodiment.

Figure 1:
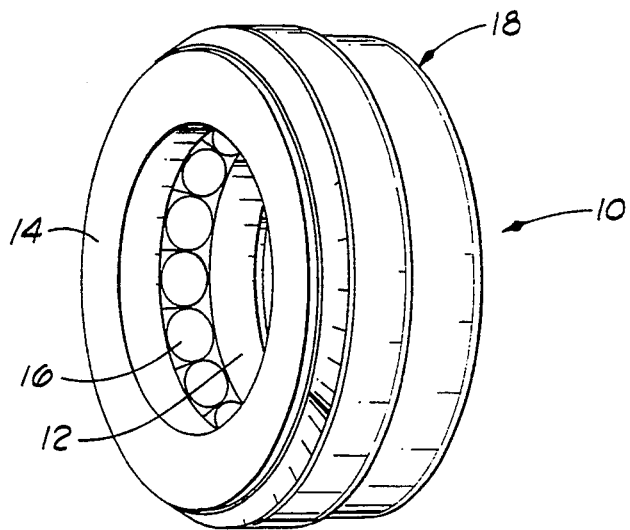
FIG. 1 is a perspective view of a tapered roller thrust bearing assembly constructed in accordance with the present invention.

With reference now to the drawings in general and to FIG. 1 in particular, there is shown therein a bearing assembly constructed in accordance with the present invention and designated by the reference numeral 10. The bearing assembly comprises first and second annular races 12 and 14 and a plurality of rollers 16 which are contained in operative relationship by a closure cup 18.

Figure 2:
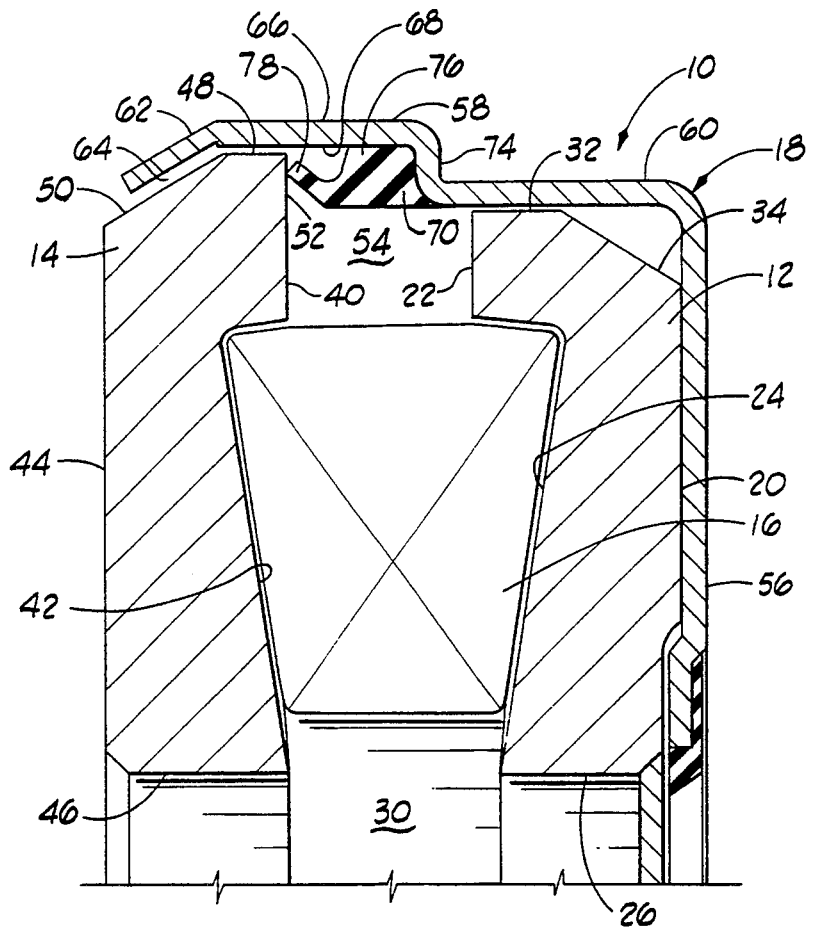
FIG. 2 is an enlarged, fragmented sectional view of the bearing assembly shown in FIG. 1.

As best seen in FIG. 2, the assembly 10 is a tapered roller thrust bearing assembly in which the rollers are frustoconical in shape. It will be appreciated, however, that the present invention may be applied to other types of thrust bearings, such as those comprising cylindrical roller elements.

The first annular race 12 has an upper surface 20 and a lower surface 22. The lower surface defines a roller receiving recess 24 which is shaped to conform to and receive the selected roller. The first annular race 12 has an inner surface 26 which partially defines a central bore 30 which extends through the entire assembly in a known manner. The first annular race 12 has an outer peripheral surface 32 which may have a beveled upper edge or shoulder 34.

The second annular race 14 has an upper surface 40 which defines a roller receiving recess 42 shaped to conform to the roller 16. The race 14 has a lower surface 44 and an inner surface 46 which also partially defines the central bore 30. The race 14 has an outer peripheral surface 48 which includes an annular shoulder 50 which slopes inwardly to intersect the lower surface 44. The external diameter of the second race 14 at its widest part is greater than the external diameter of the first race 12 at its widest part, and the upper surface 40 of the second race 14 extends radially beyond the lower surface 22 of the first race 12 to form an annular shelf 52. The lower surface 22 of the first race 12 is spaced a distance from the upper surface 40 of the second race 14 to form an annular chamber 54 which is defined inwardly by the end of the roller 16 and outwardly by the closure cup 18.

As indicated above, the closure cup 18 contains the first and second races 12 and 14 and the rollers 16 in operative relationship. To this end, the closure cup 18 has a top wall 56 which at least partially encloses and preferably is parallel to the upper surface 20 of the first race 12.

The closure cup 18 also has a side wall 58 extending down from the top wall 56. The side wall 58 of the closure cup 18 has a first portion 60 which generally encloses the peripheral surface of the first race 12. To conform to and enclose the peripheral surface 48 and the shoulder 50 of the second race 14, a lip portion 62 is provided at the lower end of the side wall 58. The inner surface of the lip portion 62 is spaced a distance from the outer peripheral surface 48 to form an annular space 64 which communicates with the annular chamber 54.

Between the lip portion 62 and the first portion 60 of the side wall 58 there is a central portion 66, and the inner surface 68 of the central portion forms the peripheral wall of the chamber 54, as described previously. The inner surface 68 includes an inner seal receiving space for supporting an internal seal 70 in the chamber 54.

In the preferred construction, the central portion 66 has a diameter greater than the first portion 60 of the closure cup 18 forming a shoulder 74 between the first portion and the central portion. While the seal 70 may take various shapes, the illustrated configuration includes a body portion 76 which is generally rectangular in cross-section and a flange portion 78 extends toward the upper surface 40 to contact the shelf portion 52. The body portion 76 has surfaces which conform to the seal receiving space formed by the inner surface of the central portion 66 and the shoulder 74 of the side wall 58 of the closure cup 18. In the preferred embodiment, the flange 78 extends from the inner corner of the body portion 76 and is directed at an acute angle toward the side wall 58 of the closure cup 18.

The seal 70 preferably is integrally formed of a flexible rubber composition, such as nitrile, or some other suitable material. The seal 70 is affixed in the seal receiving space by bonding or some suitable method.

Now it can be seen that the annular space 64, which is open at the lower edge of the lip portion 62 is divided from the chamber 54 by the flange 78. Because of the angled configuration of the flange 78, it acts as a sort of flap valve. Thus, entry of foreign fluids such as water and debris through the annular space 64 into the chamber 54 and the interior of the bearing assembly 10 is prevented. On the other hand, because of the flexibility of the material and again the angled shape of the flange 78, excess grease from inside the bearing assembly can ooze out past the flange and escape through the narrow annular space 64. In this way, adequate greasing of the bearing assembly can be assured without rendering the assembly vulnerable to the entry of water or debris and without exposing the seal 70 to injury.

Now it will be appreciated that because of the shape and location of the seal 70, it can be installed inside the closure cup by a simple bonding process. Unlike seals affixed at the border of the lip portion 62 of the closure cup 18, there is no need to deform the bonded portion of the seal to cause it to contact the outer peripheral surface of the second race 14. Thus, assembly of the bearing is simplified while at the same time improving the life and performance of the seal.

Changes may be made in the combination and arrangement of the various parts, elements, steps and procedures described herein without departing from the spirit and scope of the invention as defined in the following claims.

I claim:

1. A thrust bearing assembly comprising:

a first annular race having a peripheral surface, an upper surface, an inner surface which partially defines a central bore, and a lower surface which partially defines a roller receiving recess;

a second annular race having a peripheral surface, an upper surface which is spaced a distance from the lower surface of the first annular race to form an annular chamber therebetween and which partially defines a roller receiving recess, a lower surface, and an inner surface which partially defines a central bore;

a plurality of rollers positioned between the first and second annular races in the roller receiving recesses;

a closure cup for containing the first and second races and the rollers in operative relationship;

wherein the closure cup has a top wall which encloses the upper surface of the first annular race and a side wall extending down from the top wall which side wall encloses the peripheral surface of the first and second annular races, wherein the side wall of the closure cup has a first portion which encloses the peripheral surface of the first race, a lip portion which encloses the peripheral surface of the second race and is spaced a distance therefrom to form an annular space continuous with the annular chamber, and a central portion between the upper portion and the lip portion enclosing the annular chamber;

an annular seal attached to the inner surface of the central portion of the side wall of the closure cup, the seal having a flexible flange with a tip that contacts the upper surface of the second annular race so as to divide the annular space and the annular chamber, whereby entry of debris through the annular space into the bearing assembly is prevented and whereby escape of grease from inside the bearing assembly through the annular space is permitted.

2. The thrust bearing assembly of claim 1 wherein the rollers are tapered.

3. The thrust bearing assembly of claim 1 wherein the external diameter of the second annular race is greater than the external diameter of the first annular race to provide an annular shelf portion on the second annular race which extends radially beyond the periphery of the first annular race, where the central portion of the side wall of the closure cup has a diameter greater than the diameter of the upper portion of the closure cup, wherein the flexible flange of the seal extends from the seal a distance from the inner surface of the central portion and is directed at an acute angle toward the side wall of the closure cup.

4. The thrust bearing assembly of claim 3 wherein the peripheral surface of the second annular race defines in cross section an upper straight portion and a lower inwardly sloping shoulder portion and wherein the lip portion of the side wall of the closure cup generally conforms to the upper straight portion and the lower shoulder portion, whereby the closure cup retains the first and second annular races and the rollers in operative position.

* * * * *